US011970372B2

(12) United States Patent
Mietschnig et al.

(10) Patent No.: US 11,970,372 B2
(45) Date of Patent: Apr. 30, 2024

(54) MOBILE CRANE COMPRISING A DEVICE FOR FACILITATING OR FULLY AUTOMATICALLY CARRYING OUT A RAISING AND/OR SETTING-DOWN PROCESS OF A DERRICK BOOM, AND CORRESPONDING METHOD

(71) Applicant: Liebherr-Werk Nenzing GmbH, Nenzing (AT)

(72) Inventors: Walter Mietschnig, Brand (AT); Manfred Schapler, Vandans (AT); Tizian Lamprecht, Bludesch (AT)

(73) Assignee: LIEBHERR-WERK NENZING GMBH, Nenzing (AT)

( * ) Notice: Subject to any disclaimer, the term of this patent is extended or adjusted under 35 U.S.C. 154(b) by 12 days.

(21) Appl. No.: 17/655,504

(22) Filed: Mar. 18, 2022

(65) Prior Publication Data

US 2022/0297983 A1 Sep. 22, 2022

(30) Foreign Application Priority Data

Mar. 19, 2021 (DE) ..................... 10 2021 106 746.4

(51) Int. Cl.
*B66C 13/18* (2006.01)
*B66C 23/36* (2006.01)

(52) U.S. Cl.
CPC .............. *B66C 13/18* (2013.01); *B66C 23/36* (2013.01); *B66C 2700/0371* (2013.01); *B66C 2700/0392* (2013.01)

(58) Field of Classification Search
CPC ....... B66C 23/34; B66C 23/342; B66C 23/36; B66C 23/82; B66C 23/905; B66C 2700/0392
See application file for complete search history.

(56) References Cited

U.S. PATENT DOCUMENTS 3,930,583 A 1/1976 Jouffray
4,204,603 A 5/1980 Ducreuzet
(Continued)

FOREIGN PATENT DOCUMENTS

DE 102016015388 A1 6/2018
DE 202020104793 U1 10/2020
(Continued)

OTHER PUBLICATIONS

JP 2020019632A Machine Translation. (Year: 2020).*

*Primary Examiner* — Michael R Mansen
*Assistant Examiner* — Juan J Campos, Jr.
(74) *Attorney, Agent, or Firm* — McCoy Russell LLP

(57) ABSTRACT

The present disclosure relates to a mobile crane, which comprises a superstructure, a main boom, which extends away from the superstructure and is arranged so as to be pivotable thereon, a derrick boom, which extends away from the superstructure and is arranged so as to be pivotable thereon, and a winch assembly, wherein the winch assembly comprises a main-boom winch for actuating the main boom and a derrick-boom winch for actuating the derrick boom. The mobile crane is characterised by an assistance apparatus for facilitating or fully automatically carrying out a raising and/or setting-down process of the derrick boom, which apparatus is designed to actuate the main boom and the derrick boom, such as the main-boom winch and the derrick-boom winch, at the same time.

20 Claims, 1 Drawing Sheet

(56) References Cited

U.S. PATENT DOCUMENTS

| | | | | |
|---|---|---|---|---|
| 6,378,653 | B1 * | 4/2002 | Takahashi | B66F 11/046 182/62.5 |
| 6,588,521 | B1 * | 7/2003 | Porubcansky | B66C 23/76 212/175 |
| 8,348,073 | B2 * | 1/2013 | Foust | B66C 23/365 212/175 |
| 8,397,924 | B2 * | 3/2013 | Wanek | F16B 7/105 212/175 |
| 2020/0198700 | A1 | 6/2020 | Benck et al. | |
| 2020/0198938 | A1 * | 6/2020 | Kamiya | B66C 23/84 |
| 2021/0269289 | A1 * | 9/2021 | Kitazumi | B66C 23/76 |

FOREIGN PATENT DOCUMENTS

| | | | | |
|---|---|---|---|---|
| EP | 1000897 A1 | | 5/2000 | |
| JP | 2020019632 | * | 2/2020 | B66C 23/36 |

* cited by examiner

MOBILE CRANE COMPRISING A DEVICE FOR FACILITATING OR FULLY AUTOMATICALLY CARRYING OUT A RAISING AND/OR SETTING-DOWN PROCESS OF A DERRICK BOOM, AND CORRESPONDING METHOD

CROSS-REFERENCE TO RELATED APPLICATION

The present application claims priority to German Patent Application No. 10 2021 106 746.4 filed on Mar. 19, 2021. The entire contents of the above-listed application is hereby incorporated by reference for all purposes.

TECHNICAL FIELD

The present disclosure relates to a mobile crane comprising a device for facilitating or fully automatically carrying out a raising and/or setting-down process of a derrick boom, and to a corresponding method.

BACKGROUND

Mobile cranes are often used with boom systems in which an additional boom is directed backwards as a counterpart to the main boom directed forwards and which are used to attach a counterweight in order to increase the maximum lifting weight of the crane. These booms directed backwards are referred to as derrick booms. The angle of the derrick boom can be changed by means of the derrick-boom-adjusting winch.

SUMMARY

When installing a mobile crane, the derrick boom is generally assembled when lying in front of the basic machine and is then bolted to the basic machine. The derrick-boom-adjusting winch is connected to the top of the derrick boom by the A frame.

Once the derrick boom has been raised slightly by means of the derrick-boom winch, the main boom and possibly a luffing boom bolted to the main boom can be mounted therebelow.

Over the course of the rest of the raising process, the top of the derrick boom is connected to the top of the main boom by means of a support strand. The length of this support strand can be changed by the main-boom-adjusting winch, by means of which, in regular crane operation, the angle of the main boom can be changed but, while the derrick boom is being raised, it can also be controlled or tensioned.

The derrick boom is thus tensioned between the main-boom support strand (for example, the main-boom retaining rods and the reeving adjustment cable of the main-boom-adjusting winch) and the derrick support strand (the derrick retaining rods, the A frame and the reeving adjustment cable of the derrick-boom-adjusting winch).

In the following, a raising and setting-down process of a derrick boom is described, as is known from the prior art. Here, a fully assembled mobile crane is taken as a starting point, in which the main boom (comprising a luffing boom that can optionally be mounted thereon) is lying on the ground and the derrick boom is in front, above the main boom, i.e. has already been pivoted upwards relative to the main boom. For better understanding, FIG. 1-2 can be consulted, which are schematic views during the raising of a derrick boom.

In order to bring the derrick boom into its working crane position directed backwards for the operation of the crane, the machine operator has to actuate the derrick-boom-adjusting winch in the raising direction (cf. direction B in FIG. 1) and has to simultaneously actuate the main-boom-adjusting winch in the lowering direction. By actuating the main-boom-adjusting winch, the connection between the main boom and the derrick boom is given more play, such that the main boom lies on the ground again and the derrick boom can be pivoted backwards away from said main boom (by actuating the derrick-boom winch).

A critical phase is when the derrick boom is moved through the region around its vertical orientation. If the main-boom support-strand forces are not provided in the necessary region, the derrick boom may fall backwards against the slack main-boom support strand. It may therefore be the case that the cable connection between the derrick boom and the main boom, which can be controlled by the main-boom winch, is not under enough tension, such that, when the derrick boom passes through the vertical orientation into a position directed backwards, the derrick boom, which is no longer supported by a cable that can be controlled by the derrick-boom-adjusting winch, but instead by a cable that can be controlled by the main-boom winch, falls down backwards in an uncontrolled manner after passing through the vertical orientation. This may result in structural damage to the mobile crane, wherein, in some circumstances, the derrick boom may also collapse backwards completely, which generally results in the mobile crane becoming a write-off.

The same situation may occur when setting the derrick boom down forwards (in direction A in FIG. 1) if the pretensioning by the derrick-boom-adjusting winch is too low. In this case, the derrick boom therefore passes through the vertical orientation from a position in which it is directed backwards and, in the process, the load change for supporting the derrick boom is brought about in the different winches. If the suddenly loaded support strand, which can be controlled by the derrick-boom winch, is not tight enough during this process, the mobile crane may become damaged in this case too.

It is relatively complex to raise and set down the derrick boom, since the machine operator has to simultaneously control two winches (the derrick-boom winch and the main-boom winch) and pay attention to the support-strand forces for correct actuation. If the support-strand force is too high, in some circumstances the boom system (the main boom and the luffing boom that is potentially mounted thereon) may lift up from the ground or the basic machine may tip over. If the support-strand force is too low, in addition to the above-mentioned risks, the support strand may not be wound onto the winch properly during the load change and the cable may be damaged.

It follows that the manual operation of the two winches requires experienced operating personnel, since simultaneously operating the different winches while paying attention to the optimal support-strand forces is a very complex task.

In order for it to be possible to estimate the forces of the support strands between the top of the main boom and the top of the derrick boom or between the top of the derrick boom and the A frame, force-measuring apparatuses may be provided, to which the operator can pay attention when moving the plurality of winches. By means of the measured values from the force-measuring unit, the operator can estimate their control inputs in an improved manner, which means that it still remains extremely challenging to keep track of all the requirements.

Overall, however, the main-boom-adjusting winch has to be operated in parallel with the derrick-boom-adjusting winch, wherein it is very difficult for the machine operator to estimate the necessary actuating speed.

The aim of the present disclosure is therefore to provide a mobile crane that overcomes or at least mitigates the above-mentioned drawbacks. This is achieved by a mobile crane and by a method.

The disclosure relates to a mobile crane, which comprises a superstructure comprising a winch assembly, a main boom, which extends away from the superstructure and is arranged so as to be pivotable thereon, and a derrick boom, which extends away from the superstructure and is arranged so as to be pivotable thereon, wherein the winch assembly comprises a main-boom winch for actuating the main boom and a derrick-boom winch for actuating the derrick boom. The mobile crane is characterised by an assistance apparatus for facilitating or fully automatically carrying out a raising and/or setting-down process of the derrick boom, which apparatus is designed to actuate the main boom and the derrick boom, such as the main-boom winch and the derrick-boom winch, at the same time.

Therefore, it is no longer necessary for the operator to undertake the simultaneous actuation of the two winches, but instead the operator merely has to initiate the assistance apparatus or specify its operating speed. As a result, the operator is relieved of the burden of the demanding task of moving the derrick boom away through its vertical orientation, since the assistance apparatus then undertakes this task by setting the correct support-strand tensions for them.

According to a development of the present disclosure, it may be provided that a force-measuring unit for determining the force of the support strand from the derrick boom and/or the force of the support strand from the main boom is provided, wherein the assistance apparatus actuates the main-boom winch and/or the derrick-boom winch on the basis of the values of the support-strand force for the derrick boom and/or the main boom that are determined by the force-measuring unit, so that the support strand of the main boom and/or of the derrick boom may exceed a predetermined (first) tension value in order for it to be possible to correctly wind it up onto the main-boom winch and/or the derrick-boom winch.

Furthermore, alternatively or additionally, it may be provided that the assistance apparatus actuates the derrick boom and/or the main boom or the corresponding winches such that a predetermined (second) tension value is not exceeded, in order to prevent the mobile crane from tipping over or the main boom from lifting up. While setting down or raising the derrick boom, the main boom should remain in contact with the ground, such that only the derrick boom is moved.

By the assistance apparatus being designed to keep the corresponding forces of the support strands within an optimal range, the burden on the operator of the mobile crane is significantly relieved.

Furthermore, it may be provided here that the assistance apparatus is designed to actuate the main boom and the derrick boom, such as the main-boom winch and the derrick-boom winch, on the basis of the values determined by the force-measuring unit. The values determined by the force-measuring unit allow it to be concluded whether the forces of the support strands acting on the derrick boom are within the desired range.

According to an optional modification to the present disclosure, it may be provided that, in a raising process of the derrick boom, the assistance apparatus is also designed to actuate the derrick boom in the raising direction and to simultaneously actuate the main boom in the lowering direction, such as to actuate the derrick-boom winch in the raising direction and to actuate the main-boom winch in the lowering direction.

This actuation results in the derrick boom pivoting backwards, since the support strand which can be adjusted by the main-boom winch lets out cable, such that the distance between the main boom and the derrick boom can be increased.

According to another modification to the present disclosure, it may be provided that the support strand which can be adjusted by the main-boom winch is guided over the top of the main boom and back to the derrick boom, such that moving the main-boom winch in the lowering direction increases a possible distance between the derrick boom and the main boom. In a corresponding manner, for pivoting the derrick boom back, the derrick-boom winch then has to be operated in the raising direction, such that a distance between the horizontal main boom and the moved derrick boom is likewise increased as a result. Here, adjusting the derrick-boom winch results in the derrick boom being pivoted backwards.

Furthermore, according to the disclosure, it may be provided that, in a setting-down process of the derrick boom, the assistance apparatus is designed to actuate the derrick boom in the lowering direction and to simultaneously actuate the main boom in the raising direction, such as to actuate the derrick-boom winch in the lowering direction and to actuate the main-boom winch in the raising direction. The corresponding actuation of the different winches or of the main boom and the derrick boom then results in the angular distance between the two booms being reduced.

According to a modification to the present disclosure, it may be provided that the main boom is set down on the ground during a raising and/or setting-down process of the derrick boom. The main boom is generally only raised when the derrick boom has been moved into its position directed backwards. It may also be provided that, during a raising and/or setting-down process, the derrick boom and the main boom are arranged in a plane extending perpendicularly to the surface of the ground.

According to another development of the present disclosure, it may be provided that, during a raising and/or setting-down process, the derrick boom is tensioned between the support strand of the main boom and the derrick support strand, such that the derrick boom may be tensioned between a cable that can be controlled by the main-boom winch and a cable that can be controlled by the derrick-boom winch and/or that the derrick boom can be pivoted by activating the main-boom winch in a first direction and by activating the derrick-boom winch in a second direction opposite the first direction.

By tensioning the derrick boom between the derrick-boom-adjusting winch on a first side and the main-boom-adjusting winch, the cable of which is articulated to the top of the main boom, on the second side of the derrick boom opposite the first side, the derrick boom can be tensioned by activating the corresponding winches. Therefore, even when the derrick boom goes beyond the vertical position, it can be ensured that the derrick boom does not tip over in an uncontrolled manner, since it is tensioned from two opposite sides.

According to the present disclosure, it may be provided that, during a raising process, the assistance apparatus is also designed to pretension the support strand of the main boom when the derrick boom pivots in the raising direction, in particular when the derrick boom passes through a vertical position, such that after passing through the vertical position, the derrick boom does not fall against a slack support strand of the main boom. To do this, it may be provided that the force of the support strand of the main boom has to exceed a predetermined threshold value in order to prevent any undesired movements of the derrick boom when it passes through the vertical position.

Furthermore, according to the present disclosure, it may be provided that, during a setting-down process, the assistance apparatus is also designed to pretension the support strand of the derrick boom when the derrick boom pivots in the lowering direction, in particular when the derrick boom passes through a vertical position, such that after passing through the vertical position, the derrick boom does not fall against a slack support strand of the derrick boom. To do this, it may be provided that the force of the support strand of the derrick boom has to exceed a predetermined threshold value in order to prevent any undesired movements of the derrick boom when it passes through the vertical position.

According to another development of the present disclosure, it may be provided that the mobile crane is provided with a user interface for activating the assistance apparatus, wherein the user interface may comprise a lever, the excursion of which may influence a speed of the movement of the derrick boom when it is raised and/or set down, wherein no excursion of the lever may result in the derrick boom stopping.

As a result, the operation when raising or setting down the derrick boom is simplified, since only one lever needs to be activated and the complex actuation of the two winches is no longer required. The assistance unit therefore undertakes the actuation of the two winches, which unit activates the different winches on the basis of the support-strand forces according to an activation of the lever.

Accordingly, it may be provided that the entire process for raising or setting down the derrick boom can be controlled by a single operating lever. Furthermore, it is also no longer necessary for the operator to keep track of the support-strand forces or the winding pattern of the different adjusting winches.

It may be provided here that the user interface comprises a lever that can be moved out of a central position in two directions, wherein moving the lever out of the central position in one of the two directions results in the derrick boom being subjected to a raising process and moving the lever out of the central position in the other of the two directions results in the derrick boom being subjected to a setting-down process. It may be provided here that the two directions out of which the lever can be moved are opposite one another, such that the lever can be moved back and forth along a line.

Alternatively or additionally, it may likewise be provided that, for controlling the assistance apparatus, a lever is not used, but a button, button assembly or the like that can be used in an equivalent manner is used instead.

It may also be provided that, when using a button, it only has to be pressed once briefly and then the desired process for raising or setting down the derrick boom is carried out fully automatically. The disclosure may also cover the fact that, for maintaining a movement of the derrick boom, the button has to be kept pressed down, such that the movement of the derrick boom stops when the button is released and potentially dangerous situations can be avoided by the operator.

The disclosure also relates to a method for facilitating or fully automatically carrying out a raising and/or setting-down process of a derrick boom, such as a derrick boom of a mobile crane according to any of the variants discussed above, wherein, in the method for facilitating or fully automatically carrying out a raising and/or setting-down process of the derrick boom, the main boom and the derrick boom, such as the main-boom winch and the derrick-boom winch, are actuated at the same time by an assistance apparatus.

In this case, it may be provided that, for activating the assistance apparatus, just one operating lever is used, which can undergo an excursion from a central position and, according to its excursion, specifies the speed during the movement of the derrick boom.

Furthermore, it may be provided in the method that, during a raising and/or setting-down process, the derrick boom is tensioned between the support strand of the main boom and the derrick support strand and a main-boom winch and/or a derrick-boom winch is actuated by the assistance apparatus on the basis of a support-strand force for the derrick boom and/or the main boom, for instance, in order to keep the support strand of the main boom and/or the support strand of the derrick boom at a predetermined tension value, such that it is possible to correctly wind it up onto the main-boom winch and/or the derrick-boom winch.

When the derrick boom passes through a vertical position, during which a load change on the support strands occurs, the newly loaded support strand does not have any play, such that the derrick boom cannot tip over in an uncontrolled manner.

Furthermore, according to the method according to the disclosure, it may be provided that the derrick boom is tensioned between a cable that can be controlled by the main-boom winch and a cable that can be controlled by the derrick-boom winch and/or wherein the derrick boom can be pivoted by activating the main-boom winch in a first direction and by activating the derrick-boom winch in a second direction opposite the first direction.

It may be provided that, during a raising process, when the derrick boom pivots in the raising direction, in particular when the derrick boom passes through a vertical position, the support strand of the main boom is pretensioned by the assistance apparatus such that after passing through the vertical position, the derrick boom does not fall against a slack support strand of the main boom.

According to another development of the disclosure, it may be provided that, during a setting-down process, when the derrick boom pivots in the lowering direction, in particular when the derrick boom passes through a vertical position, the support strand of the derrick boom is pretensioned by the assistance apparatus such that after passing through the vertical position, the derrick boom does not fall against a slack support strand of the derrick boom.

BRIEF DESCRIPTION OF THE FIGURES

Further features and details of the disclosure are clear from the following description of the figures, in which.

DETAILED DESCRIPTION

Figure 1:
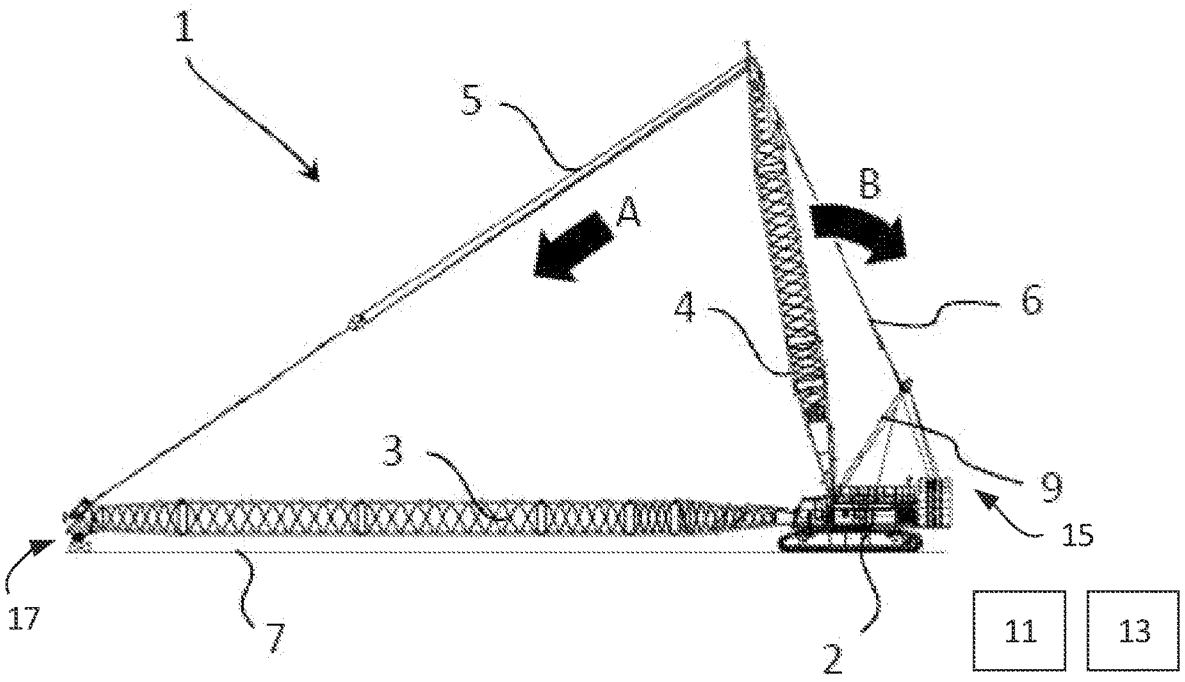
FIG. 1 is a side view of a lifting device comprising a main boom set down on the ground and a derrick boom that is in a raising or setting-down process.

FIG. 1 is a side view of a mobile crane 1, on the superstructure 2 of which a main boom 3 and a derrick boom 4 are arranged. Here, the derrick boom 4 is arranged above the main boom 3, which is lying on the ground 7, and is pivoted backwards relative thereto.

Proceeding from a winch assembly fastened to the mobile crane 1, a support strand 6 of the derrick-boom winch 15 extends to the top of the derrick boom 4, wherein the support strand 6 is guided over the A frame 9. By activating the derrick-boom winch, the derrick boom 4 can be set into a steeper position from an approximately horizontal orientation (in the direction of the arrow B) and can also be pivoted beyond its vertical position. If, however, the derrick boom 4 exceeds its vertical orientation and the weight is transferred backwards, the support strand 6 of the derrick boom 4 can no longer provide support.

In order to prevent the derrick boom from falling backwards in an uncontrolled manner, the top of the derrick boom 4 is connected to the top of the main boom 3 by a second support cable 5, i.e. the main-boom support strand, the length of which can be controlled by the main-boom-adjusting winch 17.

The two support strands 5, 6 ensure that the derrick boom can be tensioned in opposite directions, such that, when the derrick boom passes through the vertical orientation, the load change from one support strand to the other support strand can be carried out without this resulting in uncontrolled movement of the derrick boom.

Accordingly, even when moving the derrick boom in direction A (starting from a derrick boom 4 that is directed backwards), it can be provided that the boom passing through the vertical orientation does not result in it collapsing in an uncontrolled manner.

Figure 2:
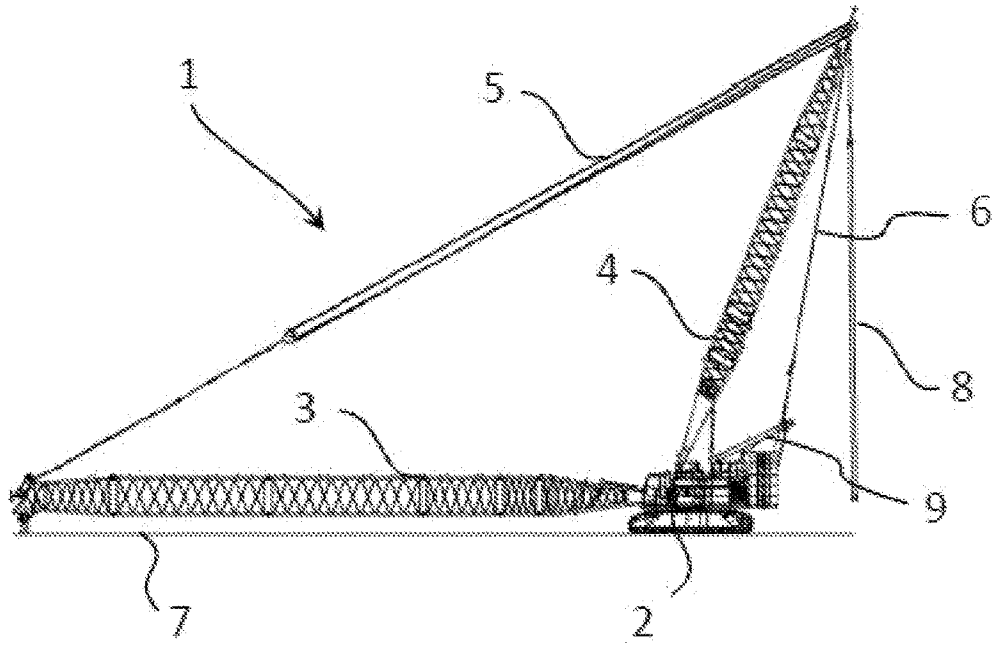
FIG. 2 is a side view of a lifting device comprising a main boom set down on the ground and a derrick boom that is in its raised position.

FIG. 2 is a side view showing a derrick boom in its final operating position. Here, the derrick boom is directed backwards and an additional weight can be added thereto via a corresponding stay 8, which weight acts as an additional counterweight for a load suspended from the main boom when heavy loads are to be lifted.

In the following, the process of raising the derrick boom will be described in greater detail.

The main boom 3, comprising a luffing boom that is possibly mounted thereon, is lying on the ground 7. The derrick boom 4 is in a defined angular range above the main boom 3. The connections between the derrick boom 4 and the superstructure 2 or the main boom 3 are pre-existing and may also comprise retaining rods, for example.

According to the disclosure, it may be provided that the machine operator activates just one operating lever of a user interface 13 in the raising direction, such that the assistance apparatus controls both the derrick-boom-adjusting winch in the raising direction and the main-boom-adjusting winch in the lowering direction. It may be provided here that the speed is dependent on the extent of the excursion of the operating lever.

The support-strand forces of the main boom 3 and the derrick boom 4, which are determined by the force-measuring unit for determining the force of the support strand 6 from the derrick boom 4 and/or the force of the support strand 5 from the main boom 3, are processed by the assistance apparatus such that the derrick boom 4 is kept within an optimal force range. As a result, the derrick boom 4 is tensioned and the situation in which the derrick boom 4 can fall against a slack main-boom support strand 5 does not occur in the region of the vertical position of the derrick boom 4.

Once the derrick boom 4 has reached its position for the operation of the crane, the process of raising the derrick boom 4 is stopped by the crane controller 11.

Furthermore, in the following, the process of setting down the derrick boom 4 will be described in greater detail. The main boom 3, comprising a luffing boom that is possibly mounted thereon, is lying on the ground 7. In its regular operating position for operation of the crane, the derrick boom 4 is directed backwards.

According to the disclosure, it may be provided that the machine operator activates the derrick-boom operating lever in the setting-down direction.

The assistance apparatus controls both the derrick-boom-adjusting winch in the lowering direction and the main-boom-adjusting winch in the raising direction at the same time, wherein the speed may be dependent on the extent of the excursion of the operating lever. The support-strand forces 5, 6 of the main boom 3 and the derrick boom 4, which are processed by the force-measuring unit, are kept within an optimal range by the assistance apparatus, such that the derrick boom 4 is tensioned and cannot fall against a slack derrick-boom support strand 6 in the region of the vertical position of the derrick boom 4.

Once the derrick boom 4 has been moved far enough forward that the support strand 5 between the derrick boom 4 and the main boom 3 can be disconnected, the machine operator stops the setting-down process by bringing the operating lever into the neutral position.

After disconnecting the support strand that can be controlled by the main-boom winch, the derrick boom can then be set down on the ground by the derrick-boom winch being accordingly actuated.

Here, it may typically be provided that, before setting the derrick boom down on the ground, the main boom is unbolted from the superstructure, such that it is possible to continue to move the derrick boom towards the ground.

FIGS. 1-2 are drawn to scale, although other relative dimensions may be used if desired. Further, FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to “an” element or “a first” element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A mobile crane, comprising:

a superstructure, a main boom, which extends away from the superstructure and is arranged so as to be pivotable thereon, a derrick boom, which extends away from the superstructure and is arranged so as to be pivotable thereon, a winch assembly on the superstructure and/or on the derrick boom, wherein the winch assembly comprises a main-boom winch for actuating the main boom and a derrick-boom winch for actuating the derrick boom, and in response to a single input from a user interface, an assistance apparatus facilitates or fully automatically performs raising of the derrick boom into a working position and/or setting-down of the derrick boom from the working position during which the assistance apparatus actuates the main boom and the derrick boom at the same time.

2. The mobile crane according to claim 1, further comprising:

a force-measuring unit for determining a force of a support strand from the derrick boom and/or a force of a support strand from the main boom, wherein the assistance apparatus raises or sets down the derrick boom actuates the main-boom winch and/or the derrick-boom winch on the basis of values of the support-strand force for the derrick boom and/or the support-strand force for the main boom that are determined by the force-measuring unit.

3. The mobile crane according to claim 2, wherein, during the raising of the derrick boom, the assistance apparatus simultaneously actuates the main boom in a lowering direction.

4. The mobile crane according to claim 3, wherein, during the setting-down of the derrick boom, the assistance apparatus simultaneously actuates the main boom in the raising direction.

5. The mobile crane according to claim 4, wherein the assistance apparatus actuates the derrick-boom winch in the lowering direction and actuates the main-boom winch in the raising direction.

6. The mobile crane according to claim 3, wherein, during the raising and/or setting-down of the derrick boom, the derrick boom is tensioned between the support strand of the main boom and the support strand of the derrick boom, such that the derrick boom is tensioned between a cable that can be controlled by the main-boom winch and a cable that can be controlled by the derrick-boom winch and/or in that the derrick boom can be pivoted by activating the main-boom winch in a first direction and by activating the derrick-boom winch in a second direction opposite the first direction.

7. The mobile crane according to claim 6, wherein the assistance apparatus pretensions the support strand of the main boom when the derrick boom pivots in the raising direction such that, after the derrick boom passes through a vertical position, the derrick boom does not fall against a slack support strand of the main boom.

8. The mobile crane according to claim 7, wherein, during a setting-down of the derrick boom, the support strand of the derrick boom is pretensioned when the derrick boom pivots in the lowering direction such that, after passing through the vertical position, the derrick boom does not fall against a slack support strand of the derrick boom.

9. The mobile crane according to claim 3, wherein the assistance apparatus actuates the derrick-boom winch in the raising direction and actuates the main-boom winch in the lowering direction.

10. The mobile crane according to claim 2, wherein the support strand of the main boom and/or of the derrick boom exceeds a predetermined tension value in order for the support strand to be wound up onto the main-boom winch and/or the derrick-boom winch.

11. The mobile crane according to claim 1, wherein the assistance apparatus sets the main boom on the ground during the raising and/or setting-down of the derrick boom.

12. The mobile crane according to claim 1, wherein the user interface comprises a lever, knob, or button excursion of which influences a speed of movement of the derrick boom when raised and/or set down.

13. The mobile crane according to claim 12, wherein the user interface comprises a lever that can be moved out of a central position in two directions, and wherein moving the lever out of the central position in one of the two directions raises the derrick boom and moving the lever in the other of the two directions sets down the derrick boom.

14. The mobile crane according to claim 12, wherein the assistance apparatus stops the derrick boom when an input of the user interface is not received.

15. A method for facilitating or fully automatically carrying out the raising and/or setting-down process of claim 1, wherein, in the method: the main boom and the derrick boom are actuated at a same time by the assistance apparatus.

16. The method according to claim 15, wherein, during the raising and/or setting-down of the derrick boom, the assistance apparatus pretensions the derrick boom between a support strand of the main boom and a support strand of the derrick boom, and the derrick boom is moved a main-boom winch and/or a derrick-boom winch is actuated by the assistance apparatus on the basis of a support-strand force for the derrick boom and/or a support-strand force for the main boom, to keep the support strand of the main boom and/or the support strand of the derrick boom at a predetermined tension value, such that the support strand is wound up onto the main-boom winch and/or the derrick-boom winch.

17. The method according to claim 16, wherein, during the raising of the derrick boom, when the derrick boom pivots in the raising direction, the support strand of the main boom is pretensioned by the assistance apparatus such that, after passing through the vertical position, the derrick boom does not fall against a slack support strand of the main boom.

18. The method according to claim 17, wherein the derrick boom passes through a vertical position.

19. The method according to claim 16, wherein, during the setting-down of the derrick boom, when the derrick boom pivots in the lowering direction, the support strand of the derrick boom is pretensioned by the assistance apparatus such that, after passing through the vertical position, the derrick boom does not fall against a slack support strand of the derrick boom.

20. The method according to claim 15, wherein the derrick boom is tensioned between a cable controlled by the main-boom winch and a cable controlled by the derrick-boom winch and/or wherein the derrick boom is pivoted by activating the main-boom winch in a first direction and by activating the derrick-boom winch in a second direction opposite the first direction.

* * * * *